US011861004B2

(12) United States Patent
Doshi (10) Patent No.: US 11,861,004 B2
(45) Date of Patent: Jan. 2, 2024

(54) SOFTWARE DISTRIBUTION COMPROMISE DETECTION

(71) Applicant: Charter Communications Operating, LLC, St. Louis, MO (US)

(72) Inventor: Brijen Doshi, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 27 days.

(21) Appl. No.: 17/390,181

(22) Filed: Jul. 30, 2021

(65) Prior Publication Data

US 2023/0030583 A1 Feb. 2, 2023

(51) Int. Cl.
*H04L 9/40* (2022.01)
*G06F 21/56* (2013.01)

(52) U.S. Cl.
CPC .......... *G06F 21/565* (2013.01); *G06F 21/563* (2013.01); *H04L 63/0428* (2013.01)

(58) Field of Classification Search
CPC ... G06F 21/563; G06F 21/565; H04L 63/0428
USPC .......................................................... 726/22
See application file for complete search history.

(56) References Cited

U.S. PATENT DOCUMENTS

| | | | | |
|---|---|---|---|---|
| 8,397,210 B2* | 3/2013 | Dutta | .................... | G06F 8/10 717/104 |
| 9,691,067 B2* | 6/2017 | Streuter | ................ | H04L 63/102 |
| 9,767,001 B2* | 9/2017 | Wong | ................... | G06F 11/3664 |
| 11,212,117 B2* | 12/2021 | Harrington | ........... | H04L 9/3268 |
| 11,416,446 B2* | 8/2022 | Sharma | ................ | G06F 16/1734 |
| 2004/0153644 A1* | 8/2004 | McCorkendale | ....... | G06F 21/56 726/24 |
| 2006/0167577 A1* | 7/2006 | Clark | ........................ | G06F 8/71 700/97 |
| 2006/0217823 A1* | 9/2006 | Hussey | ................ | G06F 11/2247 714/E11.146 |
| 2013/0097655 A1* | 4/2013 | Vaidyanathan | ......... | G06F 21/55 726/1 |
| 2013/0219183 A1* | 8/2013 | Billau | ................... | H04W 12/10 713/176 |
| 2018/0267847 A1* | 9/2018 | Smith | ................. | G06F 16/9577 |
| 2019/0205121 A1* | 7/2019 | Ericson | .............. | G06Q 20/3674 |
| 2020/0279003 A1* | 9/2020 | Dupont | ............. | G06F 16/90344 |

* cited by examiner

*Primary Examiner* — Amare F Tabor
(74) *Attorney, Agent, or Firm* — Dority & Manning, P.A.

(57) ABSTRACT

A first computing device on a first network establishes a secure communications channel with a second computing device on a second network. The first computing device receives, via the secure communications channel from the second computing device, a first software product and a first software product identifier that identifies a previously manufactured first software product. The first computing device obtains first validation information that uniquely identifies the previously manufactured first software product. The first computing device analyzes the first validation information and the first software product to determine whether the first software product is different from the previously manufactured first software product. The first computing device, in response to determining that the first software product is different from the previously manufactured first software product, sends a first message to the second computing device indicating that the first software product is not validated.

20 Claims, 8 Drawing Sheets

SOFTWARE DISTRIBUTION COMPROMISE DETECTION

BACKGROUND

Software consumers have suffered from well-publicized software breaches that occurred because the consumers relied on the reputation of a software manufacturer and installed a software product that, unbeknownst to either the consumer or the software manufacturer, was hacked. Once installed, the hacked software product may wreak havoc on a computer network, and/or secretly obtain information from the computer network. Software consumers often have no practical mechanism for knowing whether the software product they have procured from a reliable software manufacturer has been hacked.

SUMMARY

The embodiments disclosed herein implement software distribution compromise detection.

In one embodiment a method is provided. The method includes establishing by a first computing device on a first network a first secure communications channel with a second computing device on a second network. The method further includes receiving, via the first secure communications channel from the second computing device, a first software product and a first software product identifier that identifies a previously manufactured first software product. The method further includes obtaining first validation information that uniquely identifies the previously manufactured first software product. The method further includes analyzing the first validation information and the first software product to determine whether the first software product is different from the previously manufactured first software product. The method further includes, in response to determining that the first software product is different from the previously manufactured first software product, sending a first message to the second computing device indicating that the first software product is not validated.

In another one embodiment a computing device is provided. The computing device includes a memory, and a processor device coupled to the memory to establish a first secure communications channel with a second computing device. The processor device is further to receive, via the first secure communications channel from the second computing device, a first software product and a first software product identifier that identifies a previously manufactured first software product. The processor device is further to obtain first validation information that uniquely identifies the previously manufactured first software product. The processor device is further to analyze the first validation information and the first software product to determine whether the first software product is different from the previously manufactured first software product. The processor device is further to, in response to determining that the first software product is different from the previously manufactured first software product, send a first message to the second computing device indicating that the first software product is not validated.

In another embodiment a non-transitory computer-readable storage medium is provided. The non-transitory computer-readable storage medium includes executable instructions configured to cause a processor device to establish a first secure communications channel with a second computing device. The instructions are further configured to cause the processor device to receive, via the first secure communications channel from the second computing device, a first software product and a first software product identifier that identifies a previously manufactured first software product. The instructions are further configured to cause the processor device to obtain first validation information that uniquely identifies the previously manufactured first software product. The instructions are further configured to cause the processor device to analyze the first validation information and the first software product to determine whether the first software product is different from the previously manufactured first software product. The instructions are further configured to cause the processor device to, in response to determining that the first software product is different from the previously manufactured first software product, send a first message to the second computing device indicating that the first software product is not validated.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Software consumers have suffered from well-publicized software breaches that occurred because the consumers relied on the reputation of a software manufacturer and installed a software product that, unbeknownst to either the consumer or the software manufacturer, was hacked. Once installed, the hacked software product may wreak havoc on a computer network, and/or secretly obtain information from the computer network. Software consumers often have no practical mechanism for knowing whether the software product they have procured from a reliable software manufacturer has been hacked. Recent examples, such as the SolarWinds hack, highlight the potential dangers of assuming that software provided by a reputable software are free from nefarious software.

The embodiments disclosed herein implement software distribution compromise detection. The embodiments include a secret validation computing device implemented by a software manufacturer, or a trusted company. The internet protocol (IP) address of the secret validation computing device is not published. The secret validation computing device has access to validation information that corresponds to a software product. The validation information may include, for example, source code statements that make up the original software product, executable code that makes up the original software product, or the like. The secret validation computing device initiates a secure communications channel, such as an IPsec communications channel, with a known backend computing device. The secret validation computing device may reside behind a firewall that only allows connections with one or more known backend computing devices.

A software consumer obtains a software product that is originally manufactured by the software manufacturer. Prior to installation of the software product, a software consumer computing device provides the software product to a broker computing device. The broker computing device provides the software product to the backend computing device. The backend computing device provides the software product to the secret validation computing device via the secure communications channel.

The secret validation computing device accesses the validation information and compares the validation information to the software product. If the validation information matches the software product, the secret validation computing device sends a message to the backend computing device that the software is validated. The backend computing device may inform the broker computing device that the software product is validated. The broker computing device may inform the software consumer computing device that the software product is validated, and the software consumer may implement the software product knowing that the original manufacturer has validated the software product and thus that the software product has not been hacked either at the software manufacturer or in the path of distribution between the software manufacturer and the software consumer.

Figure 1:
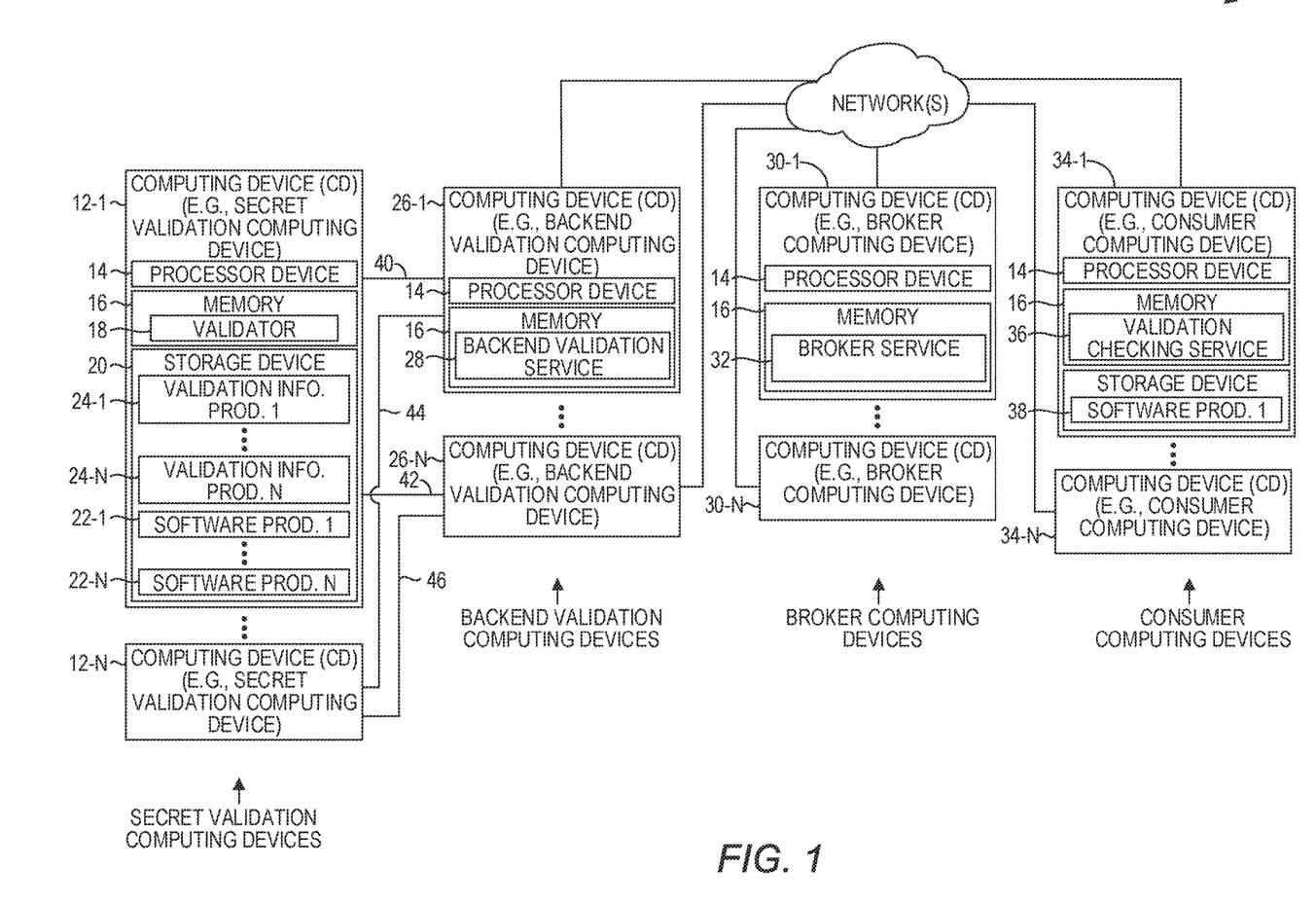
FIG. 1 is a block diagram of an environment in which software distribution compromise detection may be practiced according to one embodiment.

FIG. 1 is a block diagram of an environment 10 in which embodiments disclosed herein may be practiced. The environment 10 includes one or more computing devices 12-1-12-N (generally, computing devices 12, also sometimes referred to herein as secret validation computing devices 12). Each computing device 12 may correspond to and/or be owned and operated by a different software manufacturer. The computing device 12-1 includes a processor device 14, a memory 16, and a validator 18. The computing device 12-1 also includes, or is communicatively coupled to, a storage device 20. The storage device 20 may be inaccessible to any computing device other than the computing device 12-1. In some embodiments, the computing device 12-1 may be directly connected to the storage device 20 via a cable, internal Serial Advanced Technology Attachment (SATA) or Peripheral Component Interconnect Express (PCIe) bus, or the like.

The storage device 20 may include one or more software products 22-1-22-N (generally, software products 22) that are distributed to software consumers. The software products 22 may be source code and/or executable code. The software products 22 may be stored on the storage device 20 in a secure manner via a secure mechanism immediately after each software product 22 is deemed ready for distribution to deny any nefarious individual an opportunity to subsequently hack the software products 22.

The validator 18, or another process, generates corresponding validation information 24-1-24-N. For example, the validation information 24-1 corresponds to the software product 22-1, and the validation information 24-N corresponds to the software product 22-N. The validation information 24-1 may be an exact bit-by-bit copy of the software product 22-1, or may be derived from the software product 22-1 via some algorithm. For example, the software product 24-1 may comprise an executable file that contains binary executable instructions. The validator 18 may reverse engineer the software product 22-1 to convert the executable instructions into a higher-level pseudocode mapping, and the validation information 24-1 comprises the pseudocode mapping. Alternatively, the validator 18 may process the software product 22-1 with an algorithm which generates a bit pattern, such as, by way of non-limiting example, a hash value, and the validation information 24-1 comprises the hash value.

It is noted that because the validator 18 is a component of the computing device 12-1, functionality implemented by the validator 18 may be attributed to the computing device 12-1, generally. Moreover, in examples where the validator 18 comprises software instructions that program the processor device 14 to carry out functionality discussed herein, functionality implemented by the validator 18 may be attributed herein to the processor device 14 of the computing device 12-1.

The computing device 12-N may have similar components to the computing device 12-1 but provides a validation service for software products of a different software manufacturer.

The environment 10 may include one or more computing devices 26-1-26-N (generally, computing devices 26, also sometimes referred to herein as backend validation computing devices 26). Each computing device 26 may correspond to and/or be owned and operated by a different software validation broker entity. The computing device 26-1 includes a processor device 14, a memory 16, and a backend validation service 28. As will be discussed in greater detail below, the backend validation service 28 is configured to establish a secure communications channel with the computing device 12-1 and provide to the computing device 12-1 a software product via the secure communications channel for validation by the validator 18. The computing device 26-N may have similar components to the computing device 26-1 but may be associated with a different software validation broker entity.

It is noted that, because the backend validation service 28 is a component of the computing device 26-1, functionality implemented by the backend validation service 28 may be attributed to the computing device 26-1, generally. Moreover, in examples where the backend validation service 28 comprises software instructions that program the processor device 14 to carry out functionality discussed herein, functionality implemented by the backend validation service 28 may be attributed herein to the processor device 14 of the computing device 26-1.

The environment 10 may include one or more computing devices 30-1-30-N (generally, computing devices 30, also sometimes referred to herein as broker computing devices 30). Each computing device 30 may correspond to and/or be owned and operated by an entity. In some implementations, the computing devices 30 may be owned and/or operated by the same entity that owns and/or operates the computing devices 26-1-26-N. For example, the computing devices 26-1 and 30-1 may be operated by the same validation broker entity. In some implementations, the computing device 26-1 may not have a public IP address and may be known only to the computing device 30-1. The computing device 30-1 includes a processor device 14, a memory 16, and a broker service 32. As will be discussed in greater detail below, the broker service 32 is configured to send a software product received from a consumer computing device to a computing device 26-1, and to relay a determination of whether the software product is validated to the consumer computing device. The computing device 30-N may have similar components to the computing device 30-1 but may be associated with a different software validation broker entity.

It is noted that because the broker service 32 is a component of the computing device 30-1, functionality implemented by the broker service 32 may be attributed to the computing device 30-1, generally. Moreover, in examples where the broker service 32 comprises software instructions that program the processor device 14 to carry out functionality discussed herein, functionality implemented by the broker service 32 may be attributed herein to the processor device 14 of the computing device 30-1.

The environment 10 may include one or more computing devices 34-1-34-N (generally, computing devices 34, also sometimes referred to herein as consumer computing devices 34). Each computing device 34 may correspond to and/or be owned and operated by a different software consumer, such as a business, an individual, a governmental agency, or the like. The computing device 34-1 includes a processor device 14, a memory 16, and a validation checking service 36. As will be discussed in greater detail below, the validation checking service 36 is configured to send a software product to a computing device 30 ultimately for delivery to a computing device 12, prior to deployment of the software product. The validation checking service 36 is also configured to receive information that indicates whether the software product has been validated by a computing device 12, and thus whether the software product should be deployed. The computing device 34-N may have similar components to the computing device 34-1 but may be associated with a different software consumer.

It is noted that, because the validation checking service 36 is a component of the computing device 34-1, functionality implemented by the validation checking service 36 may be attributed to the computing device 34-1, generally. Moreover, in examples where the validation checking service 36 comprises software instructions that program the processor device 14 to carry out functionality discussed herein, functionality implemented by the validation checking service 36 may be attributed herein to the processor device 14 of the computing device 34-1.

With this background, an example of software distribution compromise detection will now be presented. Assume that a software consumer associated with the consumer computing device 34-1 obtains a software product 38 that is manufactured by the software manufacturer associated with the secret validation computing device 12-1. The software product 38 may have been obtained directly from the software manufacturer or indirectly via an intermediary. The software product 38 may comprise a completely new software distribution, an upgrade to an existing software product, a freeware software product, or any other type of software product that can be downloaded.

Prior to installation or deployment of the software product 38, the validation checking service 36 identifies the broker computing device 30-1 as the appropriate broker computing device 30 for the software product 38. This may be determined, for example, by configuration information or the like. The consumer computing device 34-1, which may be on a different network from the broker computing device 30-1 (the phrase "different network" as used in this context means that the two computing devices are coupled to networks that have different network identifiers in the context of Transmission Control Protocol/Internet Protocol, and are thus separated by one or more routers), sends the software product 38 and a software product identifier that identifies the software product 38 to the broker computing device 30-1. The software product identifier may be separate from the software product 38 or part of the software product 38, such as incorporated into a header of the software product 38 or metadata associated with the software product 38.

The broker computing device 30-1 receives the software product 38 and the software product identifier. The broker computing device 30-1 identifies the backend validation computing device 26-1 as the appropriate backend validation computing device 26 to which the software product 38 should be sent for validation. The broker computing device 30-1 and the backend validation computing device 26-1 may be on the same network or different networks.

The identification of the broker computing device 30-1 may be predetermined, such that the broker computing device 30-1 sends all software products to the backend validation computing device 26-1, or may be based on the particular software product 38. For example, the broker computing device 30-1 may send different software products to different backend validation computing devices 26.

The backend validation computing device 26-1 receives the software product 38 and the software product identifier. The backend validation service 28 determines that the secret validation computing device 12-1 is associated with the manufacturer of the software product 38 and is responsible for validating the software product 38. The backend validation computing device 26-1 and the secret validation computing device 12-1 may be on different networks. The backend validation service 28, either previously or in response to receiving the software product 38, establishes a secure communications channel 40 with the secret validation computing device 12-1. Any suitable encrypted communications channel may be established between the backend validation computing device 26-1 and the secret validation computing device 12-1. In some embodiments, the secure communications channel 40 comprises an IPsec communications channel. The backend validation service 28 sends the software product 38 and the software product identifier to the computing device 12-1 via the secure communications channel 40.

The secret validation computing device 12-1 receives the software product 38 and the software product identifier. The validator 18 determines that the software product 38 corresponds to the software product 22-1, and thus that the validation information 24-1 should be used to validate the software product 38. The validator 18 obtains the validation information 24-1 and analyzes the validation information 24-1 and the software product 38 to determine whether the software product 38 is different from the software product 22-1. The analysis may differ depending on the nature of the validation information 24-1 and the software product 38. Where the software product 38 is source code or an interpretable software product comprising a plurality of source code instructions, the validation information 24-1 may be a copy of the software product 22-1, and the analysis may include comparing the plurality of source code instructions of the software product 38 to the plurality of source code instructions of the software product 22-1 to determine whether the software product 38 is different from the previously manufactured software product 22-1.

In another embodiment, the validation information 24-1 may have been derived from the software product 22-1 by processing the software product 22-1 with a bit pattern generation function, such as a hashing algorithm, that generates a bit pattern, such as a hash, that would only be generated if presented with an exact copy of the software product 22-1. The validator 18 processes the software product 38 with the bit pattern generation function to generate a bit pattern and compares the validation information 24-1 to the generated bit pattern to determine whether the software product 38 is different from the previously manufactured software product 22-1.

In another embodiment, the software product 22-1 may comprise binary executable instructions, and a reverse-engineering function reverse engineers the software product 22-1 to generate a reverse-engineering mapping that corresponds to the software product 22-1. For example, the reverse-engineering mapping may comprise pseudo-code that corresponds to the functionality of the software product 22-1, or assembler language based on the binary executable instructions. The validator 18 causes the software product 38 to be reverse engineered by the reverse-engineering function to generate a reverse-engineering mapping that corresponds to the software product 38. The validator 18 compares the validation information 24-1 to the reverse-engineering mapping that corresponds to the software product 38 to determine whether the software product 38 is different from the previously manufactured software product 22-1.

For purposes of illustration, assume that the validator 18 determines that the software product 38 is the same as the software product 22-1 based on the analysis of the software product 38 and the validation information 24-1. The validator 18 may then send a message to the backend validation computing device 26-1 that indicates the software product 38 has been validated. The backend validation service 28, in response, sends a message to the broker computing device 30-1 that indicates the software product 38 has been validated. The broker service 32 sends a message to the consumer computing device 34-1 that indicates the software product 38 has been validated. The consumer computing device 34-1 may then send a message to a destination indicating that the software product 38 may safely be deployed, or the consumer computing device 34-1 may automatically deploy the software product 38.

It is noted that the secret validation computing devices 12 may establish secure communications channels with any number of backend validation computing devices 26. For example, the secret validation computing device 12-1 may establish the secure communications channel 40 with the backend validation computing device 26-1, and may establish a secure communications channel 42 with the backend validation computing device 26-N. Similarly, the secret validation computing device 12-N may establish a secure communications channel 44 with the backend validation computing device 26-1, and may establish a secure communications channel 46 with the backend validation computing device 26-N.

Figure 2:
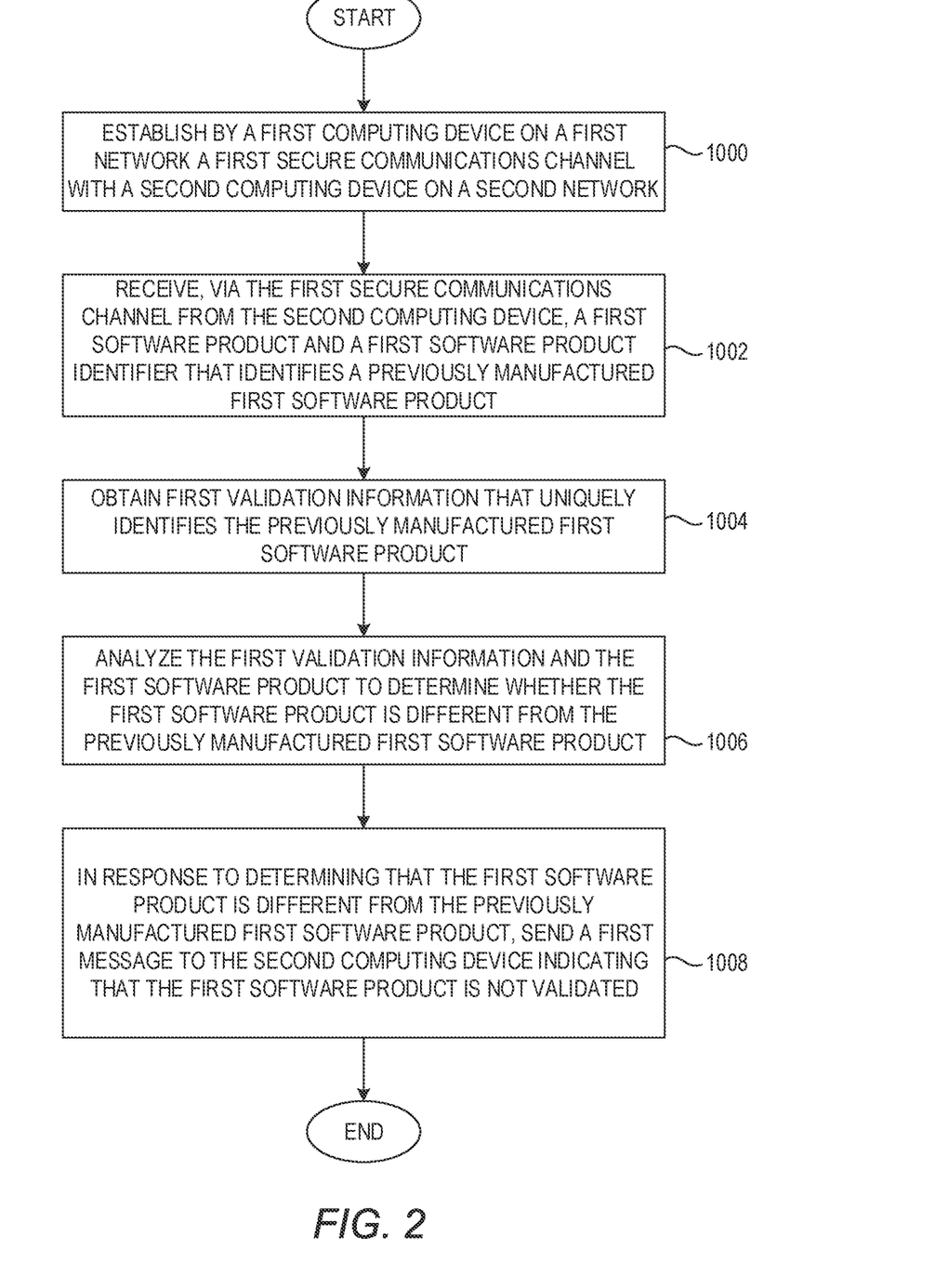
FIG. 2 is a flowchart of a method for software distribution compromise detection from the perspective of a secret validation computing device according to one embodiment.

FIG. 2 is a flowchart of a method for software distribution compromise detection from the perspective of the computing device 12-1 according to one embodiment. FIG. 2 will be discussed in conjunction with FIG. 1. In this example, we assume that the software product 38 has been hacked or otherwise altered since being manufactured. The computing device 12-1, on a first network, establishes the secure communications channel 40 with the computing device 26-1, on a second network (FIG. 2, block 1000). The computing device 12-1 receives, via the secure communications channel 40 from the computing device 26-1, the software product 38 and a software product identifier that identifies the previously manufactured software product 22-1 (FIG. 2, block 1002). The computing device 12-1 obtains the validation information 24-1 that uniquely identifies the previously manufactured software product 22-1 (FIG. 2, block 1004). The computing device 12-1 analyzes the validation information 24-1 and the software product 38 to determine whether the software product 38 is different from the previously manufactured software product 22-1 (FIG. 2, block 1006). The computing device 12-1, in response to determining that the software product 38 is different from the previously manufactured software product 22-1, sends a message to the computing device 26-1 indicating that the software product 38 is not validated (FIG. 2, block 1008).

Figure 3A:
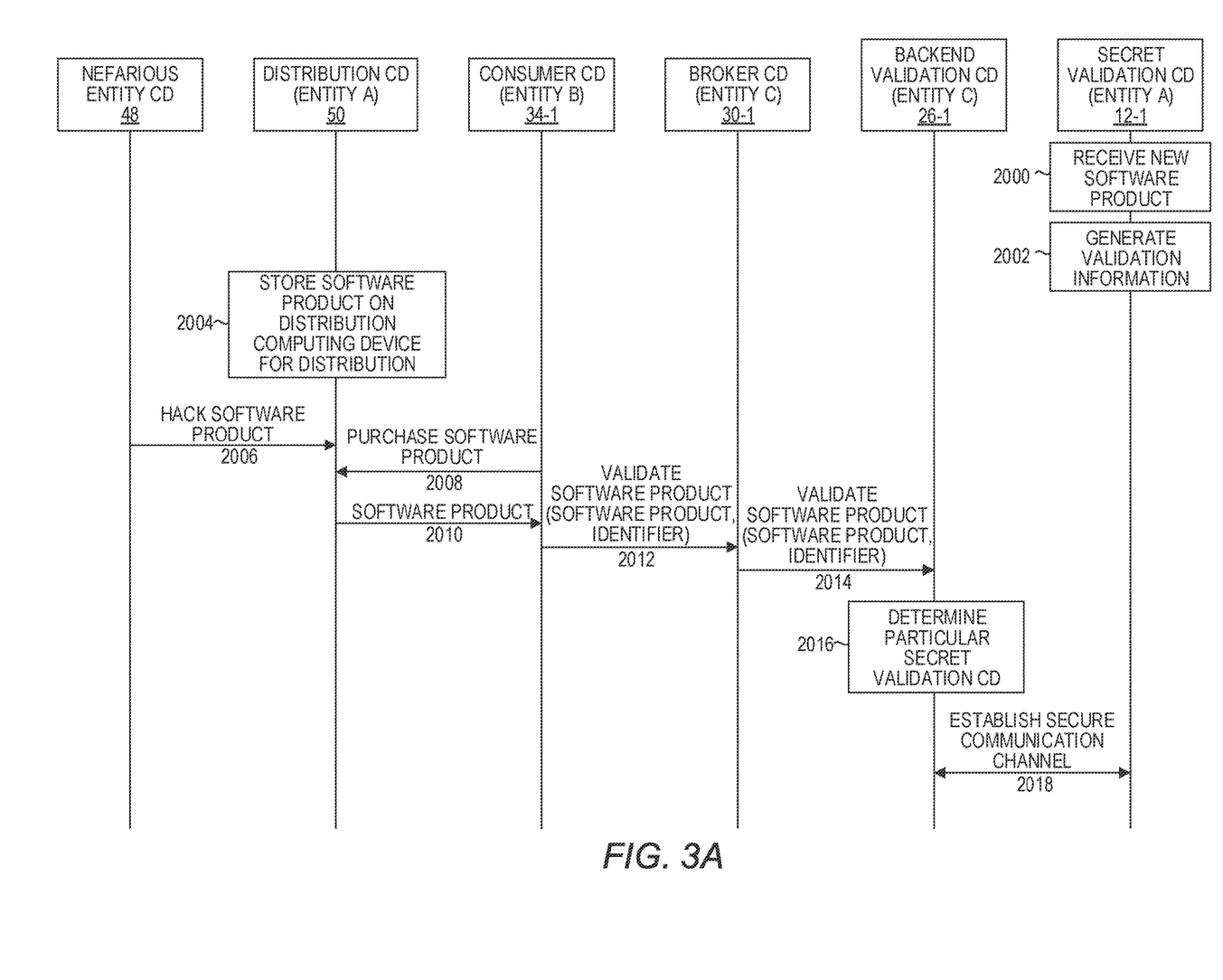
FIGS. 3A-3B illustrate a sequence diagram for software distribution compromise detection according to one embodiment.
Figure 3B:
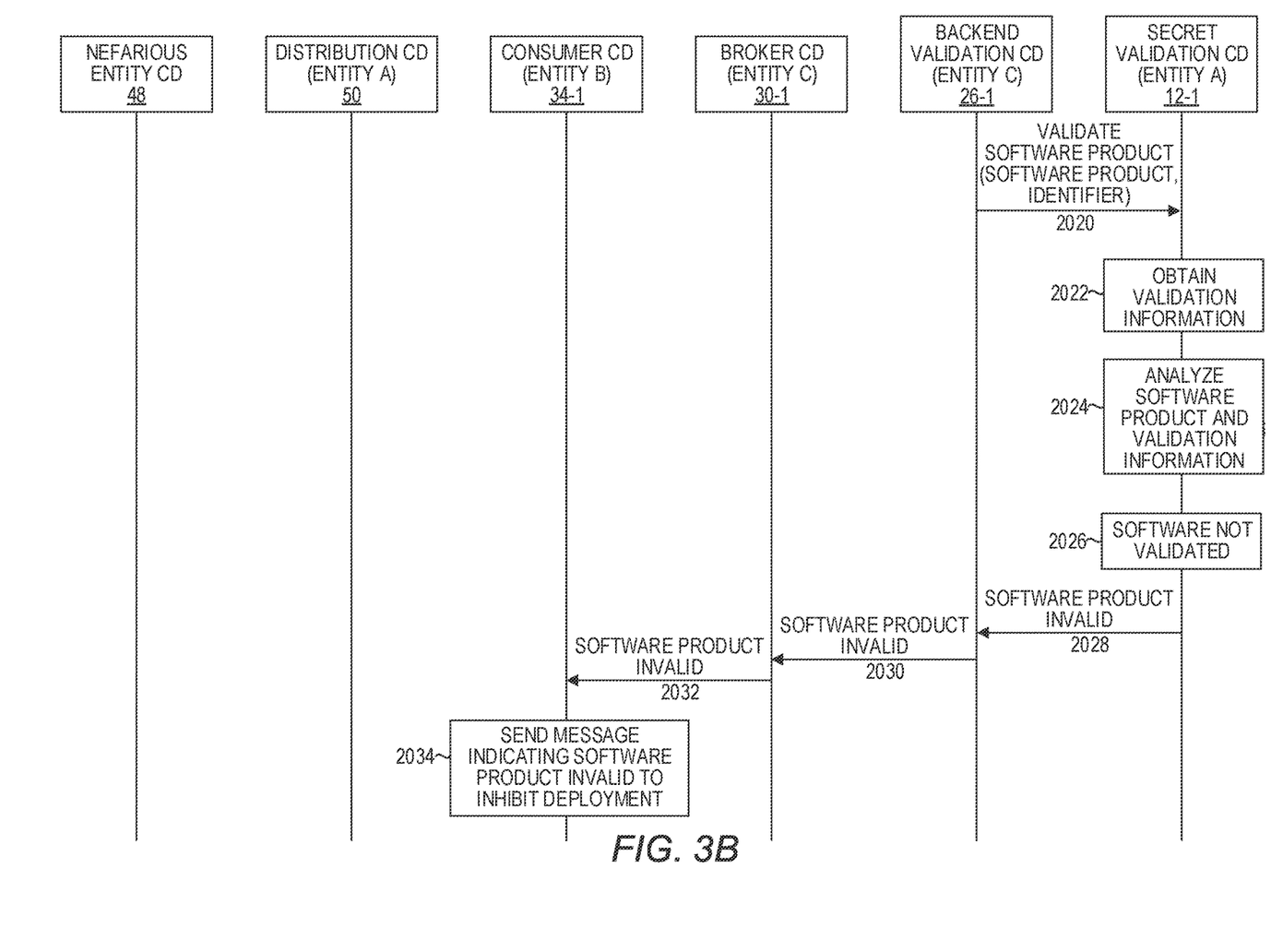

FIGS. 3A-3B illustrate a sequence diagram for software distribution compromise detection according to one embodiment. Referring first to FIG. 3A, assume that a software manufacturer, Entity A, develops a new software product under secure conditions. The software product is provided to the secret validation computing device 12-1 that is associated with, such as owned and/or operated by, Entity A. As an example, the software product may be securely downloaded onto a secure storage device accessible only to the secret validation computing device 12-1. The secret validation computing device 12-1 receives the new software product and generates corresponding validation information as described above with regard to FIGS. 1 and 2 (FIG. 3A, steps 2000-2002). The software product is then subsequently stored on a distribution computing device 50 of Entity A for distribution to customers (FIG. 3A, step 2004).

Assume next that a nefarious entity 48 hacks the software product residing on the distribution computing device 50 (FIG. 3A, step 2006). Subsequently, a user operating the consumer computing device 34-1 associated with Entity B purchases the software product and downloads the software product from the distribution computing device 50 (FIG. 3A, steps 2008-2010). The consumer computing device 34-1, prior to deployment of the software product, initiates a secure validation check by sending the software product and information that identifies the software product to the broker computing device 30-1 associated with Entity C (FIG. 3A, step 2012).

The broker computing device 30-1 operates in conjunction with a backend validation computing device 26-1, also associated with Entity C. The broker computing device 30-1 sends the software product to the backend validation computing device 26-1 (FIG. 3A, step 2014). The backend validation computing device 26-1 determines, based on the software product, that the secret validation computing device 12-1, associated with Entity A, is the correct secret validation computing device 12 to which the software product should be sent for validation (FIG. 3A, step 2016). If a secure communications channel has not yet been set up between the backend validation computing device 26-1 and the secret validation computing device 12-1, the backend validation computing device 26-1 and the secret validation computing device 12-1 establish a secure communications channel (FIG. 3A, step 2018).

Referring next to FIG. 3B, the backend validation computing device 26-1 sends the software product and software identifier to the secret validation computing device 12-1 over the secure communications channel (FIG. 3B, step 2020). The secret validation computing device 12-1 identifies the correct validation information, which was generated prior to the software product being installed on the distribution computing device 50, and analyzes the validation information and the received software product (FIG. 3B, steps 2022-2024). The secret validation computing device 12-1 determines, based on the validation information and the software product, that the software product includes different code than that of the original software product (FIG. 3B, step 2026). The secret validation computing device 12-1 sends a message to the backend validation computing device 26-1 that indicates the software product is invalid (FIG. 3B, step 2028). The backend validation computing device 26-1 sends a message to the broker computing device 30-1 that indicates the software product is invalid (FIG. 3B, step 2030). The broker computing device 30-1 sends a message to the consumer computing device 34-1 that indicates the software product is invalid (FIG. 3B, step 2032). The consumer computing device 34-1 may send a message that indicates the software product is invalid and/or perform some other action to inhibit deployment of the software product (FIG. 3B, step 2034).

Figure 4:
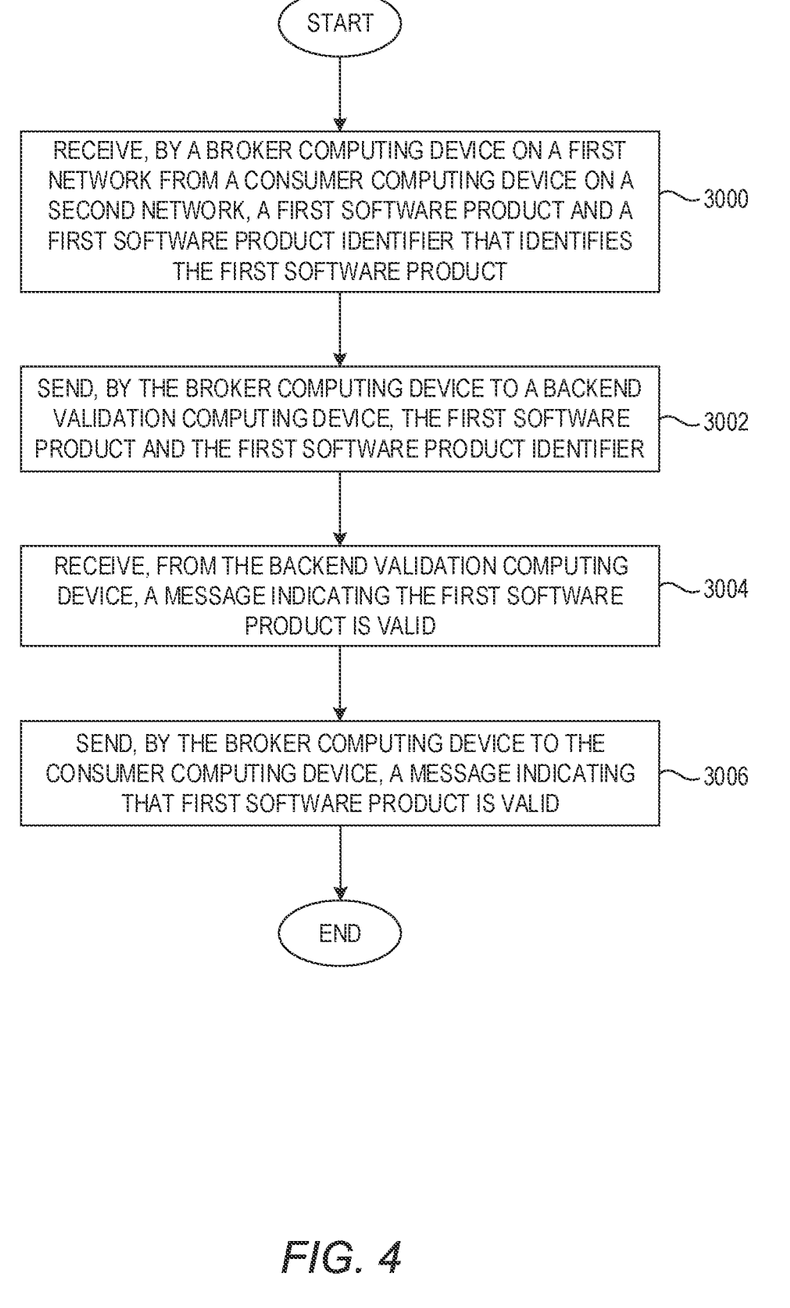
FIG. 4 is a flowchart of a method for software distribution compromise detection from the perspective of a broker computing device according to one embodiment.

FIG. 4 is a flowchart of a method for software distribution compromise detection from the perspective of the broker computing device 30-1 according to one embodiment. FIG. 4 will be discussed in conjunction with FIG. 1. The broker computing device 30-1 receives, from the consumer computing device 34-1, the software product 38 and the software product identifier that identifies the software product 38 (FIG. 4, block 3000). The broker computing device 30-1 sends, to the backend validation computing device 26-1, the software product 38 and the software product identifier (FIG. 4, block 3002). Assuming that the secret validation computing device 12-1 determines that the software product 38 is valid, the broker computing device 30-1 subsequently receives, from the backend validation computing device 26-1, a message indicating the software product 38 is valid (FIG. 4, block 3004). The broker computing device 30-1 sends, to the consumer computing device 34-1, a message indicating that software product 38 is valid (FIG. 4, block 3006).

Figure 5:
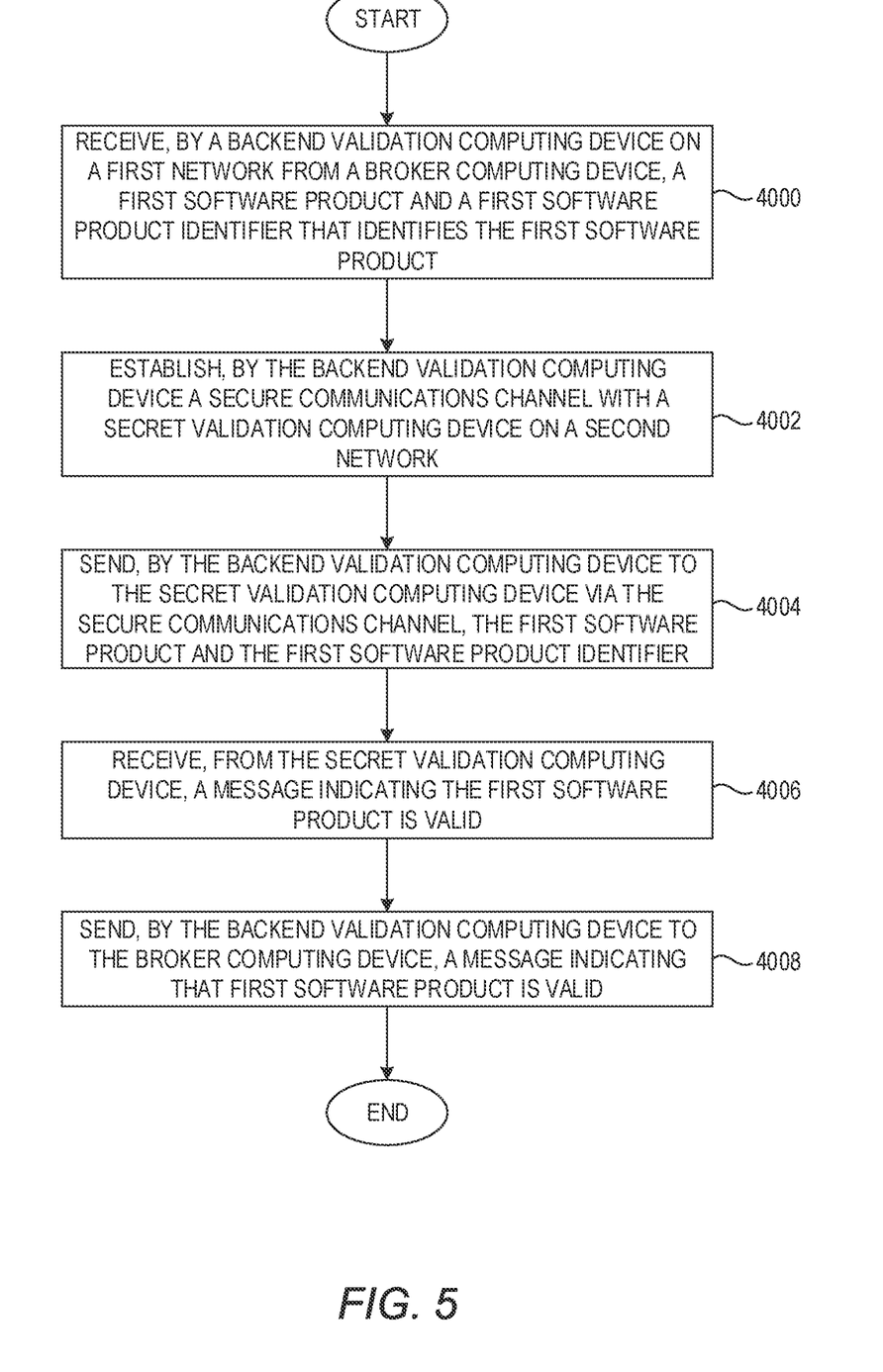
FIG. 5 is a flowchart of a method for software distribution compromise detection from the perspective of a validation computing device according to one embodiment.

FIG. 5 is a flowchart of a method for software distribution compromise detection from the perspective of the backend validation computing device 26-1 according to one embodiment. FIG. 5 will be discussed in conjunction with FIG. 1. The backend validation computing device 26-1 receives, from the broker computing device 30-1, the software product 38 and the software product identifier that identifies the software product 38 (FIG. 5, block 4000). The backend validation computing device 26-1 establishes, a secure communications channel with the secret validation computing device 12-1 (FIG. 5, block 4002). The backend validation computing device 26-1 sends, via the secure communications channel to the secret validation computing device 12-1, the software product 38 and the software product identifier (FIG. 5, block 4004). The backend validation computing device 26-1 receives, from the secret validation computing device 12-1, a message indicating the software product 38 is valid (FIG. 5, block 4006). The backend validation computing device 26-1 sends, to the broker computing device 30-1, a message indicating that the software product 38 is valid (FIG. 5, block 4008).

Figure 6:
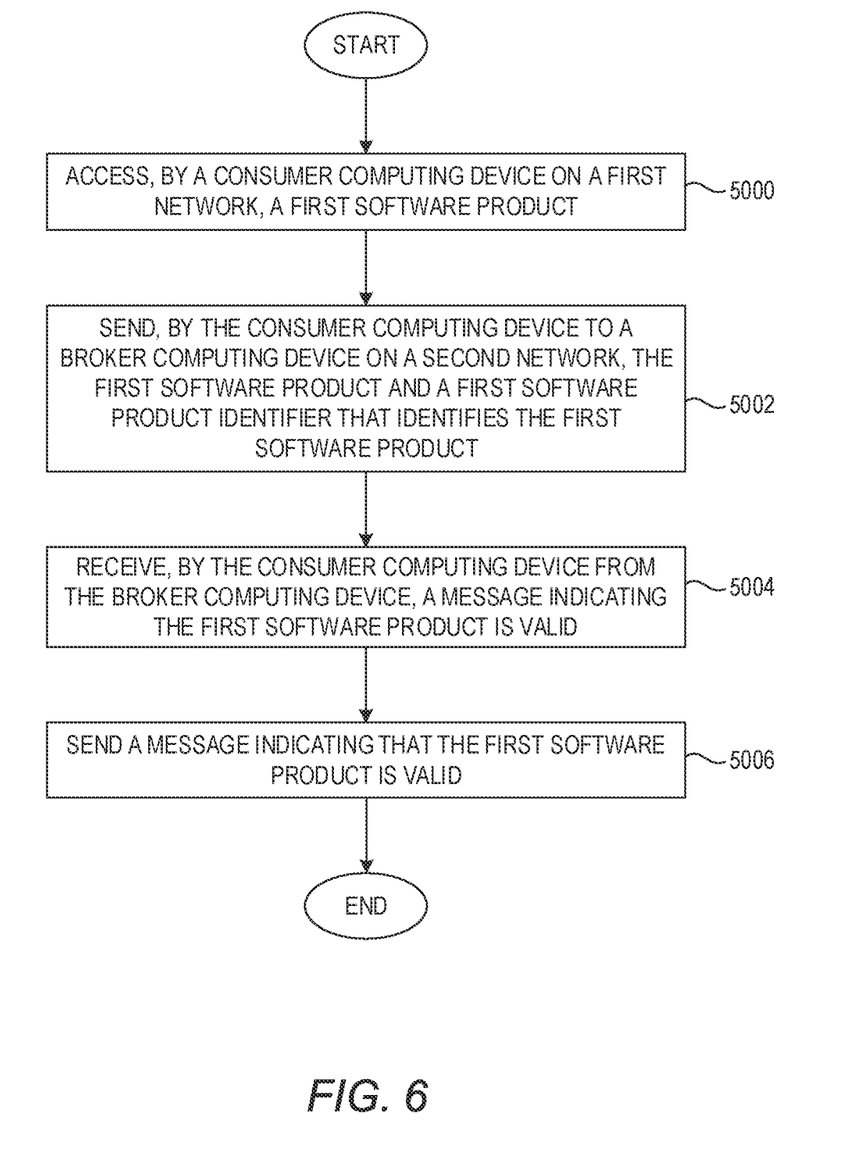
FIG. 6 is a flowchart of a method for software distribution compromise detection from the perspective of a consumer computing device according to one embodiment.

FIG. 6 is a flowchart of a method for software distribution compromise detection from the perspective of the consumer computing device 34-1 according to one embodiment. FIG. 6 will be discussed in conjunction with FIG. 1.

The consumer computing device 34-1 accesses the software product 38 (FIG. 6, block 5000). The consumer computing device 34-1 sends, to the broker computing device 30-1, the software product 38 and the software product identifier that identifies the software product 38 (FIG. 6, block 5002). Assuming that the secret validation computing device 12-1 determines that the software product 38 is valid, the consumer computing device 34-1 receives, from the broker computing device 12-1, a message indicating the software product 38 is valid (FIG. 6, block 5004). The consumer computing device 34-1 sends a message indicating that the software product 38 is valid (FIG. 6, block 5006).

Figure 7:
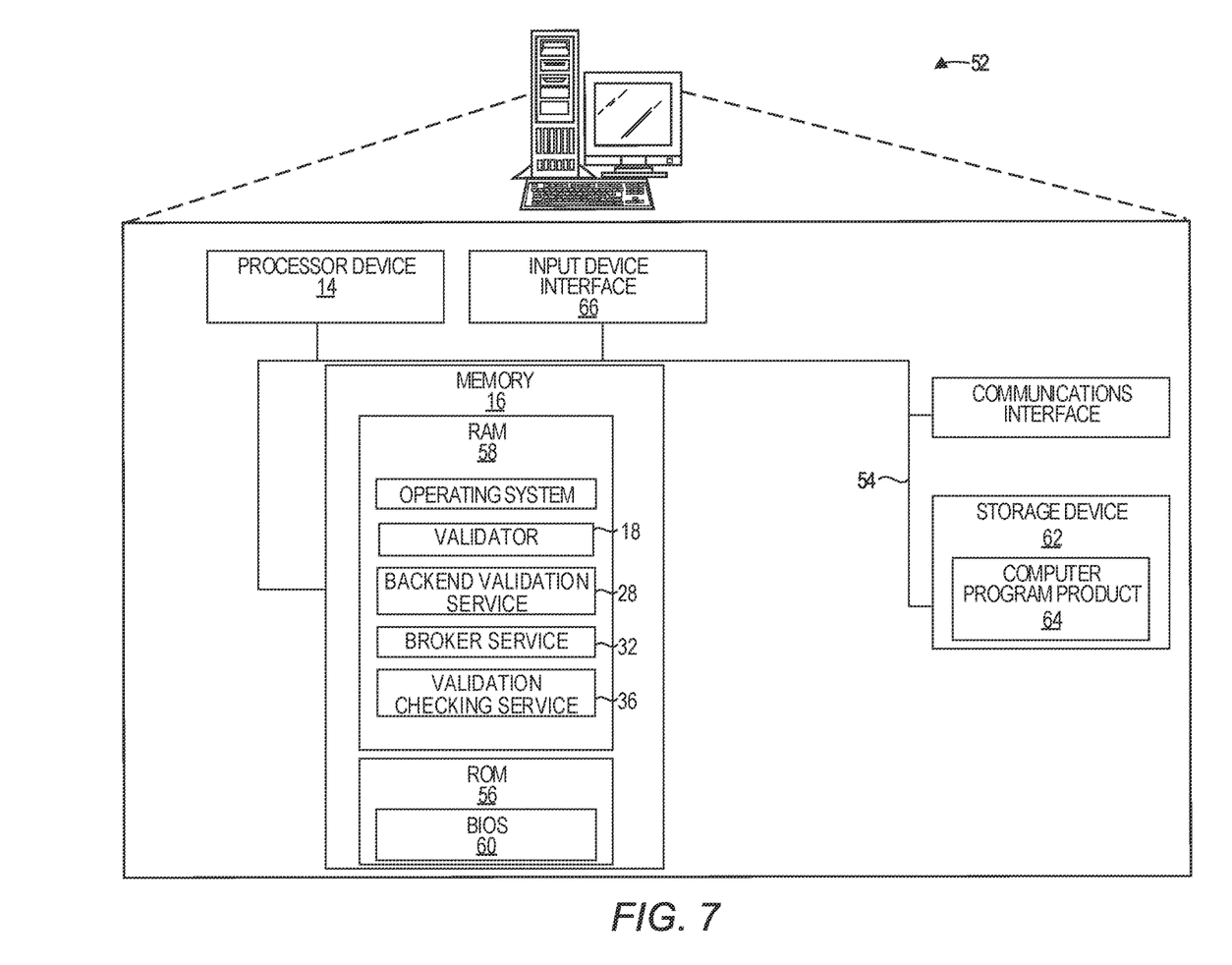
FIG. 7 is a block diagram of a computing device suitable for implementing embodiments disclosed herein.

FIG. 7 is a block diagram of a computing device 52 suitable for implementing any of the computing devices disclosed herein. The computing device 52 may comprise any computing or electronic device capable of including firmware, hardware, and/or executing software instructions to implement the functionality described herein, such as a computer server, a desktop computing device, a laptop computing device, or the like. The computing device 52 includes the processor device 14, the system memory 16, and a system bus 54. The system bus 54 provides an interface for system components including, but not limited to, the system memory 16 and the processor device 14. The processor device 14 can be any commercially available or proprietary processor.

The system bus 54 may be any of several types of bus structures that may further interconnect to a memory bus (with or without a memory controller), a peripheral bus, and/or a local bus using any of a variety of commercially available bus architectures. The system memory 16 may include non-volatile memory 56 (e.g., read-only memory (ROM), erasable programmable read-only memory (EPROM), electrically erasable programmable read-only memory (EEPROM), etc.), and volatile memory 58 (e.g., random-access memory (RAM)). A basic input/output system (BIOS) 60 may be stored in the non-volatile memory 56 and can include the basic routines that help to transfer information between elements within the computing device 52. The volatile memory 58 may also include a high-speed RAM, such as static RAM, for caching data.

The computing device 52 may further include or be coupled to a non-transitory computer-readable storage medium such as a storage device 62, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 62 and other drives associated with computer-readable media and computer-usable media may provide non-volatile storage of data, data structures, computer-executable instructions, and the like.

A number of modules can be stored in the storage device 62 and in the volatile memory 58, including an operating system and one or more program modules, such as the validator 18, the backend validation service 28, the broker service 32, or the validation checking service 36, depending on which computing device is being implemented.

All or a portion of the examples may be implemented as a computer program product 64 stored on a transitory or non-transitory computer-usable or computer-readable storage medium, such as the storage device 62, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14.

An operator may also be able to enter one or more configuration commands through a keyboard (not illustrated), a pointing device such as a mouse (not illustrated), or a touch-sensitive surface such as a display device. Such input devices may be connected to the processor device 14 through an input device interface 66 that is coupled to the system bus 54 but can be connected by other interfaces such as a parallel port, an Institute of Electrical and Electronic Engineers (IEEE) 1394 serial port, a Universal Serial Bus (USB) port, an IR interface, and the like.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
    establishing by a first computing device on a first network a first secure communications channel with a second computing device on a second network;
    receiving, via the first secure communications channel from the second computing device, a first software product and a first software product identifier that identifies a previously manufactured first software product;
    obtaining, from a storage device that is inaccessible to any device other than the first computing device, first validation information that uniquely identifies the previously manufactured first software product;
    analyzing the first validation information and the first software product to determine whether the first software product is different from the previously manufactured first software product; and
    in response to determining that the first software product is different from the previously manufactured first software product, sending a first message to the second computing device indicating that the first software product is not validated.

2. The method of claim 1 wherein establishing by the first computing device on the first network the first secure communications channel with the second computing device on the second network comprises establishing by the first computing device on the first network an Internet Protocol Security (IPSec) communications channel with the second computing device on the second network.

3. The method of claim 1 wherein the first validation information comprises a first plurality of source code instructions and the first software product comprises a second plurality of source code instructions, and wherein analyzing the first validation information and the first software product to determine whether the first software product is different from the previously manufactured first software product comprises comparing the first plurality of source code instructions to the second plurality of source code instructions to determine whether the first software product is different from the previously manufactured first software product.

4. The method of claim 1 wherein the first validation information comprises a first bit pattern, and wherein analyzing the first validation information and the first software product to determine whether the first software product is different from the previously manufactured first software product comprises:
    processing the first software product with a bit pattern generation function to generate a second bit pattern; and
    comparing the first bit pattern to the second bit pattern to determine whether the first software product is different from the previously manufactured first software product.

5. The method of claim 1 wherein the first validation information comprises a first reverse-engineering mapping, and wherein analyzing the first validation information and the first software product to determine whether the first software product is different from the previously manufactured first software product comprises:
    reverse engineering the first software product to generate a second reverse-engineering mapping; and
    comparing the first reverse-engineering mapping to the second reverse-engineering mapping to determine whether the first software product is different from the previously manufactured first software product.

6. The method of claim 1 further comprising:
    establishing by the first computing device on the first network a second secure communications channel with a third computing device on a third network;
    receiving, via the second secure communications channel from the third computing device, a second software product and a second software product identifier that identifies a previously manufactured second software product;
    obtaining second validation information that uniquely identifies the previously manufactured second software product;
    analyzing the second validation information and the second software product to determine whether the second software product is different from the previously manufactured second software product; and
    in response to determining that the second software product is identical to the previously manufactured second software product, sending a message to the third computing device indicating that the second software product is validated.

7. The method of claim 1 further comprising:
    prior to receiving the first software product and the first software product identifier that identifies the previously manufactured first software product, accessing the previously manufactured first software product;
generating, based on the previously manufactured first software product, the first validation information; and
storing, on the storage device inaccessible to any device other than the first computing device, the first validation information.

8. The method of claim 7 wherein generating, based on the previously manufactured first software product, the first validation information further comprises reverse engineering the first software product to generate the first validation information.

9. A computing device, comprising:
a memory; and
a processor device coupled to the memory to:
establish on a first network a first secure communications channel with a second computing device on a second network;
receive, via the first secure communications channel from the second computing device, a first software product and a first software product identifier that identifies a previously manufactured first software product;
obtain, from a storage device that is inaccessible to any device other than the first computing device, first validation information that uniquely identifies the previously manufactured first software product;
analyze the first validation information and the first software product to determine whether the first software product is different from the previously manufactured first software product; and
in response to determining that the first software product is different from the previously manufactured first software product, send a first message to the second computing device indicating that the first software product is not validated.

10. The computing device of claim 9 wherein to establish the first secure communications channel with the second computing device, the processor device is further to establish by the first computing device an Internet Protocol Security (IPSec) communications channel with the second computing device.

11. The computing device of claim 9 wherein the first validation information comprises a first plurality of source code instructions and the first software product comprises a second plurality of source code instructions, and wherein to analyze the first validation information and the first software product to determine whether the first software product is different from the previously manufactured first software product, the processor device is further to compare the first plurality of source code instructions to the second plurality of source code instructions to determine whether the first software product is different from the previously manufactured first software product.

12. The computing device of claim 9 wherein the first validation information comprises a first bit pattern, and wherein to analyze the first validation information and the first software product to determine whether the first software product is different from the previously manufactured first software product, the processor device is further to:
process the first software product with a bit pattern generation function to generate a second bit pattern; and
compare the first bit pattern to the second bit pattern to determine whether the first software product is different from the previously manufactured first software product.

13. The computing device of claim 9 wherein the first validation information comprises a first reverse-engineering mapping, and wherein to analyze the first validation information and the first software product to determine whether the first software product is different from the previously manufactured first software product the processor device is further to:
reverse engineer the first software product to generate a second reverse-engineering mapping; and
compare the first reverse-engineering mapping to the second reverse-engineering mapping to determine whether the first software product is different from the previously manufactured first software product.

14. The computing device of claim 9 wherein the processor device is further to:
establish a second secure communications channel with a third computing device;
receive, via the second secure communications channel from the third computing device, a second software product and a second software product identifier that identifies a previously manufactured second software product;
obtain second validation information that uniquely identifies the previously manufactured second software product;
analyze the second validation information and the second software product to determine whether the second software product is different from the previously manufactured second software product; and
in response to determining that the second software product is identical to the previously manufactured second software product, send a message to the third computing device indicating that the second software product is validated.

15. The computing device of claim 9 wherein the processor device is further to:
prior to receiving the first software product and the first software product identifier that identifies the previously manufactured first software product, access the previously manufactured first software product;
generate, based on the previously manufactured first software product, the first validation information; and
store, on a storage device inaccessible to any device other than the first computing device, the first validation information.

16. The computing device of claim 15 wherein to generate, based on the previously manufactured first software product, the first validation information, the processor device is further to reverse engineer the first software product to generate the first validation information.

17. A non-transitory computer-readable storage medium that includes executable instructions configured to cause a processor device to:
establish on a first network a first secure communications channel with a second computing device on a second network;
receive, via the first secure communications channel from the second computing device, a first software product and a first software product identifier that identifies a previously manufactured first software product;
obtain, from a storage device that is inaccessible to any device other than the first computing device, first validation information that uniquely identifies the previously manufactured first software product;

analyze the first validation information and the first software product to determine whether the first software product is different from the previously manufactured first software product; and in response to determining that the first software product is different from the previously manufactured first software product, send a first message to the second computing device indicating that the first software product is not validated.

18. The non-transitory computer-readable storage medium of claim 17 wherein the first validation information comprises a first plurality of source code instructions and the first software product comprises a second plurality of source code instructions, and wherein to analyze the first validation information and the first software product to determine whether the first software product is different from the previously manufactured first software product, the instructions further cause the processor device to compare the first plurality of source code instructions to the second plurality of source code instructions to determine whether the first software product is different from the previously manufactured first software product.

19. The non-transitory computer-readable storage medium of claim 17 wherein the first validation information comprises a first bit pattern, and wherein to analyze the first validation information and the first software product to determine whether the first software product is different from the previously manufactured first software product, the instructions further cause the processor device to:

process the first software product with a bit pattern generation function to generate a second bit pattern; and compare the first bit pattern to the second bit pattern to determine whether the first software product is different from the previously manufactured first software product.

20. The non-transitory computer-readable storage medium of claim 17 wherein the instructions further cause the processor device to:

prior to receiving the first software product and the first software product identifier that identifies the previously manufactured first software product, access the previously manufactured first software product;

generate, based on the previously manufactured first software product, the first validation information; and store, on the storage device inaccessible to any device other than the first computing device, the first validation information.

* * * * *